(12) United States Patent
Wang

(10) Patent No.: US 12,133,144 B2
(45) Date of Patent: Oct. 29, 2024

(54) ACCESS CONTROL METHOD AND APPARATUS, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Shukun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 358 days.

(21) Appl. No.: 17/704,547

(22) Filed: Mar. 25, 2022

(65) Prior Publication Data

US 2022/0217507 A1    Jul. 7, 2022

Related U.S. Application Data

(63) Continuation of application No. PCT/CN2019/108175, filed on Sep. 26, 2019.

(51) Int. Cl.
  *H04W 4/06* (2009.01)
  *H04W 48/02* (2009.01)
  *H04W 48/08* (2009.01)

(52) U.S. Cl.
  CPC ............ *H04W 4/06* (2013.01); *H04W 48/02* (2013.01); *H04W 48/08* (2013.01)

(58) Field of Classification Search
  None
  See application file for complete search history.

(56) References Cited

U.S. PATENT DOCUMENTS

| | | | |
|---|---|---|---|
| 2011/0141908 A1* | 6/2011 | Ishida | H04W 48/02 370/312 |
| 2019/0028962 A1* | 1/2019 | Chun | H04W 48/02 |
| 2020/0351754 A1* | 11/2020 | Kim | H04W 48/02 |

FOREIGN PATENT DOCUMENTS

| | | |
|---|---|---|
| CN | 102291780 A | 12/2011 |
| CN | 106358158 A | 1/2017 |
| WO | 2018203709 A1 | 11/2018 |

OTHER PUBLICATIONS

International Search Report and the Written Opinion Dated Jun. 23, 2020 From the International Searching Authority Re. Application No. PCT/CN2019/108175, 11 pages.
Huawei et al. "Unified access control for NB-IoT and eMTC connected to 5GC". 3GPP TSG-RAN WG3 Meeting #106 R2-1906169, May 17, 2019, 6 pages.
LG Electronics Inc. "Consideration on MBMS Service for V2X", 3GPP TSG-RAN WG3 Meeting #102 R3-186600, Nov. 16, 2018, 2 pages.

* cited by examiner

*Primary Examiner* — Hong S Cho
(74) *Attorney, Agent, or Firm* — BAYES PLLC

(57) ABSTRACT

Provided in embodiments of the present application are an access control method and apparatus, a terminal device, and a network device. The method comprises: a terminal device receives first configuration information, the first configuration information comprising an access control configuration parameter corresponding to a first access category; and according to the access control configuration parameter, the terminal device executes an access control operation corresponding to an MBMS service.

16 Claims, 5 Drawing Sheets

---

701

A terminal device receives the first configuration information, wherein the first configuration information comprises at least one access control configuration parameter.

702

The terminal determines attribute information of the first MBMS service and determines from the first configuration information a first access control configuration parameter corresponding to the attribute information of the first MBMS service, and executes an access control operation corresponding to the first MBMS service according to the first access control configuration parameter.

ACCESS CONTROL METHOD AND APPARATUS, TERMINAL DEVICE, AND NETWORK DEVICE

CROSS REFERENCE TO RELATED APPLICATIONS

This application is a continuation of International Application No. PCT/CN2019/108175, filed on Sep. 26, 2019, entitled "ACCESS CONTROL METHOD AND APPARATUS, TERMINAL DEVICE, AND NETWORK DEVICE", the entire contents of which are incorporate herein by reference in its entirety.

BACKGROUND OF DISCLOSURE

1. Field of Disclosure

The disclosure relates generally to the field of mobile communication technology, and, more particularly to an access control method and apparatus, terminal device, and network device.

2. Description of Related Art

In order to achieve network-side load control, the Unified Access Control (UAC) mechanism is introduced into the New Radio (NR) system. Currently, there is no feedback mechanism for the reception of Multimedia Broadcast Multicast Service (MBMS) services, and any terminal device in any Radio Resource Control (RRC) state can receive MBMS services, so the terminal device need not enter the RRC connection state to receive the MBMS services. Thus, there is no access control mechanism (i.e., UAC mechanism) designed for the reception of MBMS services.

SUMMARY

Embodiments of the present application provide an access control method and apparatus, a terminal device, and a network device.

An embodiment of the present application provides an access control method, comprising:
  a terminal device receiving first configuration information, wherein the first configuration information comprises access control configuration parameters corresponding to a first access category; and
  the terminal device executing an access control operation corresponding to an MBMS service according to the access control configuration parameters.

An embodiment of the present application provides an access control method, comprising:
  a terminal device for receiving first configuration information, wherein the first configuration information comprises at least one access control configuration parameter.
  The terminal device is configured for determining attribute information of a first MBMS service and determining a first access control configuration parameter corresponding to the attribute information of the first MBMS service from the first configuration information, and executing an access control operation corresponding to the first MBMS service according to the first access control configuration parameter.

An embodiment of the present application provides an access control method, comprising:
  a network device for sending first configuration information, wherein the first configuration information comprises access control configuration parameters corresponding to a first access category; the access control configuration parameters being used by the terminal device to execute an access control operation corresponding to an MBMS service.

An embodiment of the present application provides an access control method, comprising:
  a network device for sending first configuration information, wherein the first configuration information comprises at least one access control configuration parameter; the at least one access control configuration parameter comprising a first access control configuration parameter, the first access control configuration parameter having a correspondence with first attribute information of a first MBMS service, the first access control configuration parameter being used by the terminal device to execute the access control operation corresponding the first MBMS service.

An embodiment of the present application provides an access control apparatus, comprising:
  a receiving unit for receiving first configuration information, wherein the first configuration information comprises access control configuration parameters corresponding to a first access category; and
  a processing unit for executing an access control operation corresponding to an MBMS service according to the access control configuration parameters.

An embodiment of the present application provides an access control apparatus, comprising:
  a receiving unit for receiving first configuration information, wherein the first configuration information comprises at least one access control configuration parameter;
  a determination unit for determining attribute information of a first MBMS service and determining a first access control configuration parameter corresponding to the attribute information of the first MBMS service from the first configuration information; and
  a processing unit for executing an access control operation corresponding to the first MBMS service according to the first access control configuration parameter.

An embodiment of the present application provides an access control apparatus, comprising:
  a sending unit for sending first configuration information, wherein the first configuration information comprises access control configuration parameters corresponding to a first access category; the access control configuration parameters being used by a terminal device to execute an access control operation corresponding to an MBMS service.

An embodiment of the present application provides an access control apparatus, comprising:
  a sending unit for sending first configuration information, wherein the first configuration information comprises at least one access control configuration parameter; the at least one access control configuration parameter comprising a first access control configuration parameter, the first access control configuration parameter having a correspondence with first attribute information of a first MBMS service, the first access control configuration parameter being used by a terminal device to execute the access control operation corresponding the first MBMS service.

An embodiment of the present application provides a terminal device, which comprises a processor and a memory. The memory is used to store a computer program, and the processor is used to call and execute the computer program stored in the memory to perform the access control method described above.

An embodiment of the present application provides a network device, which comprises a processor and a memory. The memory is used to store a computer program, and the processor is used to call and execute the computer program stored in the memory to perform the access control method described above.

An embodiment of the present application provides a chip for implementing the access control method described above.

Specifically, the chip includes: a processor for calling and executing the computer program from the memory, causing the device on which the chip is installed to perform the access control method described above.

An embodiment of the present application provides a computer-readable storage medium for storing a computer program that causes a computer to perform the access control method described above.

An embodiment of the present application provides a computer program product comprising computer program instructions that cause a computer to perform the access control method described above.

An embodiment of the present application provides a computer program, which when it is executed on a computer, causes the computer to execute the access control method described above.

The above technical solutions enable support of MBMS services in the NR system, and at the same time, a solution is proposed that enables an access control mechanism for MBMS services to be supported in the NR system by assigning access categories to MBMS services.

BRIEF DESCRIPTION OF DRAWINGS

The accompanying drawings illustrated herein are used to provide a further understanding of the present application and form part of the present application, and the exemplary embodiments and descriptions of the application are used to explain the application, and do not constitute an improper limitation of the application. In the accompanying drawings, wherein.

DETAILED DESCRIPTION OF EMBODIMENTS

The technical solutions in the embodiments of the present application will be described below in conjunction with the accompanying drawings in the embodiments of the present application. Obviously, the described embodiments are a part of the embodiments of the present application, not all of the embodiments.

Based on the embodiments in this application, all other embodiments obtained by those of ordinary skill in the art without creative work shall fall within the protection scope of the application.

The technical solutions of the embodiments of this application can be applied to various communication systems, such as: Long Term Evolution (LTE) systems, LTE Frequency Division Duplex (FDD) systems, LTE Time Division Duplex (TDD) systems, 5G communication systems or other future communication systems.

Figure 1:
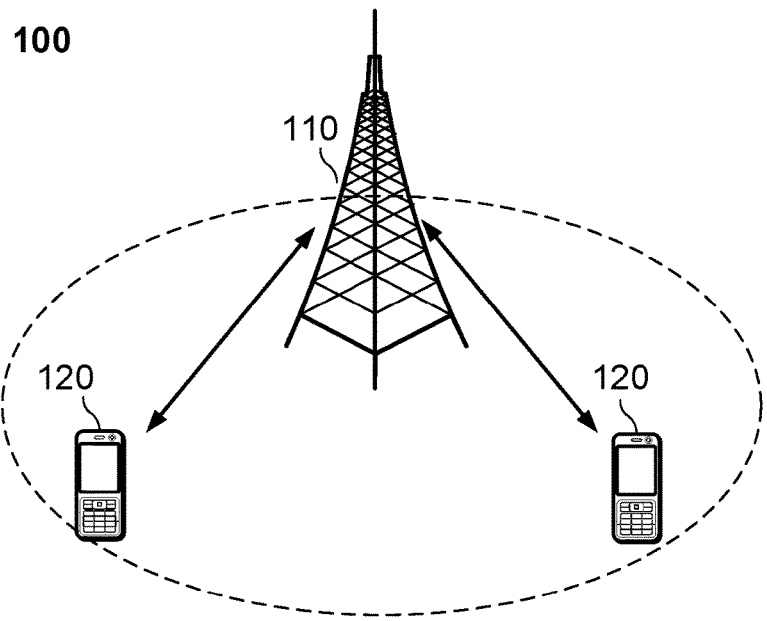
FIG. 1 is a schematic diagram of a communication system architecture provided by an embodiment of the present application.

For example, FIG. 1 shows a communication system 100 applied in an embodiment of the present application. The communication system 100 may include a network device 110, and the network device 110 may be a device that communicates with a terminal 120 (or referred to as a communication terminal, terminal). The network device 110 may provide communication coverage for a specific geographic area and may communicate with terminals located within that coverage area. Optionally, the network device 110 may be an Evolutional Node B (eNB or eNodeB) in an LTE system, or a wireless controller in a Cloud Radio Access Network (CRAN), or the network device may be a mobile switching center, a relay station, an access point, an in-vehicle device, a wearable device, a hub, a switch, a bridge, a router, a network-side device in 5G networks or any network device in other future communication system.

The communication system 100 also comprises at least one terminal 120 located within the coverage area of the network device 110. "Terminal" as used herein includes, but is not limited to, connection via wired line, such as connection via Public Switched Telephone Networks (PSTN), Digital Subscriber Line (DSL), digital cable and direct cable; and/or another data connection/network; and/or via a wireless interface, such as a cellular network, a Wireless Local Area Network (WLAN), a digital television network such as a Digital Video Broadcasting-Handheld (DVB-H) network, a satellite network, an amplitude modulation frequency modulation (AM-FM) broadcast transmitter; and/or a device of another terminal configured to receive/transmit communication signals; and/or Internet of things (IOT) devices. A terminal set to communicate via a wireless interface may be referred to as a "wireless communication terminal", "wireless terminal", or "mobile terminal". Examples of mobile terminals include, but are not limited to, satellite or cellular phones; Personal Communications System (PCS) terminals that can combine cellular radio telephony with data processing, fax, and data communication capabilities; and PDAs that can include radio telephones, pagers, Internet/Intranet access, Web browsers, notepads, calendars and/or Global Positioning System (GPS) receiver; and conventional lap top and/or handheld receivers or other electronic devices that include a radiotelephone transceiver. A terminal may refer to an access terminal, a User Equipment (User Equipment, UE), a user unit, a user station, a mobile station, a mobile site, a remote station, a remote terminal, a mobile device, a user terminal, a terminal, a wireless communication device, a user agent, or a user device. The access terminal can be a cellular telephone, a cordless telephone, a Session Initiation Protocol (SIP) telephone, a Wireless Local Loop (WLL) station, a Personal Digital Assistant (PDA), a handheld device with wireless communication function, a computing device or other processing device connected to a wireless modem, an in-vehicle device, a wearable device, a terminal in a 5G network or a terminal in future evolved PLMNs, etc.

Alternatively, device to device (D2D) communication can be performed between the terminals 120.

Optionally, the 5G communication system or 5G network may also be referred to as a New Radio (NR) system or NR network.

FIG. 1 illustrates one network device and two terminals. Optionally, the communication system 100 may include multiple network devices and the coverage of each network device may include arbitrary numbers of terminals, and the embodiment of the application is not limited thereto.

Optionally, the communication system 100 may further include other network entities, such as network controllers, mobile management entities, and other network entities, and the embodiment of the application is not limited thereto.

It should be understood that the devices with communication functions in the network/system of the embodiment of the present application may be referred to as communication devices. Taking the communication system 100 illustrated in FIG. 1 as an example, the communication devices may include the network devices 110 and the terminals 120 having communication functions, and the network devices 110 and terminals 120 can be specific devices as described above and will not be described herein; the communication devices may also include other devices in the communication system 100, such as network controllers, mobile management entities, and other network entities, and the embodiment of the application is not limited thereto.

It should be understood that the terms "system" and "network" in this document are often used interchangeably in this document. The term "and/or" in this document is only an association relationship descriptive for the associated objects, which means that there can be three relationships, for example, A and/or B, which can indicate: the existence of A alone, the existence of both A and B, and the existence of B alone these three situations.

In addition, the character "/" in this document generally indicates that the associated objects before and after are in an "or" relationship.

In order to facilitate the understanding of the technical solutions of the embodiments of the present application, the technical solutions related to the embodiments of the present application are described in the following.

In order to facilitate the understanding of the technical solutions of the embodiments of the present application, the technical solutions related to the embodiments of the present application are described below.

With people's pursuit of speed, latency, high-speed mobility, energy efficiency, and the diversity and complexity of services in future life, the 3rd Generation Partnership Project (3GPP) international standards organization began to develop 5G. The main application scenarios of 5G are enhanced Mobile Broadband (eMBB), Ultra-Reliable Low-Latency Communications (URLLC), and massive Machine-Type Communications (mMTC).

On the one hand, eMBB still aims at users' access to multimedia content, services and data, and its demand is growing rapidly. On the other hand, since eMBB may be deployed in different schemes, such as indoor, urban, rural, etc., its capabilities and needs vary widely, so it cannot be simply detailed in a few words. It must be analyzed in detail in combination with specific deployment scenarios. Typical applications of URLLC include industrial automation, power automation, telemedicine operation (surgery), traffic safety and security, and so on. Typical features of mMTC include high connection density, small data volume, latency-insensitive services, low cost and long lifetime of modules, and so on.

RRC State:

5G defines a new RRC state, i.e., the RRC inactive (RRC_INACTIVE) state, for the purpose of reducing null signaling and quickly restoring wireless connectivity and quickly resuming data services. This state is different from the RRC idle (RRC_IDLE) state and the RRC active (RRC_ACTIVE) state, wherein:

1) RRC_IDLE state (also referred to as idle state): Mobility is UE-based cell selection or reselection, paging is initiated by the Core Network (CN), and the paging area is configured by the CN. There is no UE context on the base station side, and no RRC connection exists.

2) RRC_CONNECTED state (also referred to as connected state): RRC connection exists in the state, and UE context exists on both the base station side and the UE side. The network side knows the location of the UE specifically to the cell level. Mobility is the mobility controlled by the network side. Unicast data can be transmitted between the UE and the base station.

3) RRC_INACTIVE state (also referred to as inactive state): Mobility is UE-based cell selection or reselection, and connection between CN-NR exists in the state. UE context exists on a specific base station. Paging is triggered by a radio access network (RAN), and RAN-based paging area is managed by RAN. The network side knows the location of UE to the RAN-based paging area level.

MBMS:

MBMS was introduced in 3GPP Release 6 (R6). MBMS is a technology for transmitting data from one data source to multiple UEs by sharing network resources, which can efficiently utilize network resources while providing multimedia services to achieve broadcasting and multicasting of multimedia services at higher speed (e.g., 256 kbps).

As the MBMS spectrum efficiency in 3GPP R6 is low, it is not enough to effectively carry and support the operation of mobile TV type services. Therefore, in LTE, 3GPP explicitly proposes to enhance the support capability for downlink high-speed MBMS services and defines the design requirements for the physical layer and air interface.

3GPP R9 introduced the evolved MBMS (eMBMS) into LTE. eMBMS proposed the concept of Single Frequency Network (SFN), i.e., Multimedia Broadcast multicast service Single Frequency Network (MBSFN). MBSFN uses a uniform frequency to send service data in all cells simultaneously while ensuring inter-cell synchronization. This approach can greatly improve the overall signal-to-noise ratio distribution in the cell, and the spectrum efficiency will also be greatly improved accordingly. eMBMS is based on internet protocol (IP) multicast protocol to realize service broadcasting and multicasting.

In LTE or enhanced LTE (LTE-Advanced, LTE-A), MBMS has only broadcast bearer mode and no multicast bearer mode.

In addition, the reception of MBMS service is applicable to the UE in an idle state or a connected state.

The Single Cell Point To Multiploint (SC-PTM) concept was introduced in 3GPP R13, and SC-PTM is based on the MBMS network architecture.

MBMS introduces new logical channels, including Single Cell-Multicast Control Channel (SC-MCCH) and Single Cell-Multicast Transport Channel (SC-MTCH). MCCH and SC-MTCH are mapped to Downlink-Shared Channel (DL-SCH), and further, DL-SCH is mapped to Physical Downlink Shared Channel (PDSCH), where SC-MCCH and SC-MTCH belong to logical channels, DL-SCH belongs to transport channels, and PDSCH belongs to physical channels. SC-MCCH and SC-MTCH do not support Hybrid Automatic Repeat request (HARD) operation.

MBMS introduces a new System Information Block (SIB) type, i.e., SIB20. Specifically, the configuration information of the SC-MCCH, which is only one SC-MCCH for a cell, is transmitted through the SIB20. The configuration information of the SC-MCCH includes: a modification period of the SC-MCCH, a repetition period of the SC-MCCH, and the radio frames and subframes of the scheduled SC-MCCH. Further, 1) the boundary of the modification period of the SC-MCCH satisfies SFN mod m=0, where SFN represents the system frame number of the boundary and m is the modification period of the SC-MCCH configured in the SIB20 (i.e., sc-mcch-ModificationPeriod). 2) The radio frames of the scheduled SC-MCCH satisfy: SFN mod mcch-RepetitionPeriod=mcch-Offset, where SFN represents the system frame number of the radio frame, mcch-RepetitionPeriod represents the repetition period of the SC-MCCH, and mcch-Offset represents the SC-MCCH offset. 3) The subframe of the scheduled SC-MCCH is indicated by the sc-mcch-Subframe indication.

SC-MCCH is scheduled through Physical Downlink Control Channel (PDCCH). On the one hand, a new Radio Network Tempory Identity (RNTI), i.e., Single Cell RNTI (SC-RNTI), is introduced to identify the PDCCH (e.g., SC-MCCH PDCCH) used to schedule the SC-MCCH, and optionally, the fixed value of SC-RNTI is FFFC. On the other hand, a new RNTI, that is, a Single Cell Notification RNTI (SC-N-RNTI), is introduced to identify a PDCCH (such as a notification PDCCH) used to indicate the change notification of the SC-MCCH, and optionally, the fixed value of the SC-N-RNTI is FFFB. Further, one of 8 bits in downlink control information 1C (DCI 1C) can be used to indicate the change notification. In LTE, the configuration information of SC-PTM is based on SC-MCCH configured by the SIB20, then SC-MCCH configures SC-MTCH, and SC-MTCH is used to transmit service data.

Specifically, the SC-MCCH transmits only one message (i.e., SCPTMConfiguration), which is used to configure the configuration information of the SC-PTM. The configuration information of the SC-PTM includes Temporary Mobile Group Identity (TMGI), session id, Group RNTI (G-RNTI), Discontinuous Reception (DRX) configuration information, and SC-PTM service information of the neighboring areas, etc. It should be noted that SC-PTM in R13 does not support Robust Header Compression (ROHC) function.

The downlink discontinuous reception of SC-PTM is controlled by the following parameters: onDurationTimerSCPTM, drx-InactivityTimerSCPTM, SC-MTCH-SchedulingCycle, and SC-MTCH-SchedulingOffset.

The timer onDurationTimerSCPTM is started when [(SFN*10)+subframe number] modulo (SC-MTCH-SchedulingCycle)=SC-MTCH-SchedulingOffset is satisfied.

The timer drx-InactivityTimerSCPTM is started when downlink PDCCH scheduling is received.

Downlink SC-PTM services are received only when the timer onDurationTimerSCPTM or drx-InactivityTimerSCPTM is running.

SC-PTM service continuity adopts the MBMS service continuity concept based on SIB15, i.e. "SIB15+MBMSInterestIndication" method. The service continuity of UEs in the idle state is based on the concept of frequency priority.

In NR, many scenarios need to support multicast and broadcast services, such as in vehicle to vehicle (V2V) networks, Industrial Internet, etc. Therefore, it is necessary to introduce MBMS in NR.

UAC:

For network side load control, the UAC mechanism is introduced in NR. In the UAC mechanism, Access category (Access category) and Access identity (Access identity) are defined. Their meanings are shown in Table 1 and Table 2 in the following.

TABLE 1

| Access category | UE-related constraints | Types of access attempts |
| --- | --- | --- |
| 0 | All | MO signalling resulting from paging |
| 1 | UE is configured for delay tolerant service and subject to access control for Access category 1, which is judged based on relation of UE's HPLMN and the selected PLMN. | All except for Emergency |
| 2 | All | Emergency |
| 3 | All except for the conditions in Access category 1. | MO signalling on NAS level resulting from other than paging |
| 4 | All except for the conditions in Access category 1. | MMTEL voice (NOTE 3) |
| 5 | All except for the conditions in Access category 1. | MMTEL video |
| 6 | All except for the conditions in Access category 1. | SMS |
| 7 | All except for the conditions in Access category 1. | MO data that do not belong to any other Access Categories (NOTE 4) |

TABLE 1-continued

| Access category | UE-related constraints | Types of access attempts |
|---|---|---|
| 8 | All except for the conditions in Access category 1 | MO signalling on RRC level resulting from other than paging |
| 9-31 | | Reserved standardized Access Categories |
| 32-63 | All | Based on operator classification |

TABLE 2

| Access identity | UE Configuration |
|---|---|
| 0 | UE is not configured with any parameters from this table |
| 1 | UE is configured for Multimedia Priority Service (MPS). |
| 2 | UE is configured for Mission Critical Service (MCS). |
| 3-10 | Reserved for future use |
| 11 | Access Class 11 is configured in the UE. |
| 12 | Access Class 12 is configured in the UE. |
| 13 | Access Class 13 is configured in the UE. |
| 14 | Access Class 14 is configured in the UE. |
| 15 | Access Class 15 is configured in the UE. |

UAC Parameter Configuration:

The access network element (e.g., base station) broadcasts access control information related to the access category and access identity, and the Access Stratum (AS) of the UE executes access control operations (i.e., ACB checking) based on the access control information and the access category and access identity provided by the Access Stratum (AS) layer or the Non-Access Stratum (NAS).

The access control information broadcast by the access network elements includes UAC parameters, which are configured at the granularity of per access category and/or at the granularity of per Public Land Mobile Network (PLMN). The UAC parameters are UAC barring information sets UAC-BarringInfoSet, with up to 8 UAC-BarringInfoSet configured on the network side and each access category associated with one UAC-BarringInfoSet, for a total of 64 access categories (of which access category 0 does not need to be configured). It is also possible to associate one UAC-BarringPerCatList per PLMN. Further, if per PLMN information is not configured, the above configuration is applicable to all PLMNs.

For access category 1, auxiliary information is configured to assist in determining whether the access control operation (i.e., ACB checking) is used for access category 1, in which the auxiliary information is uac-AccessCategory1-SelectionAssistanceInfo.

UAC Mechanism: Access Control Operation (i.e., ACB Checking)

Figure 2:
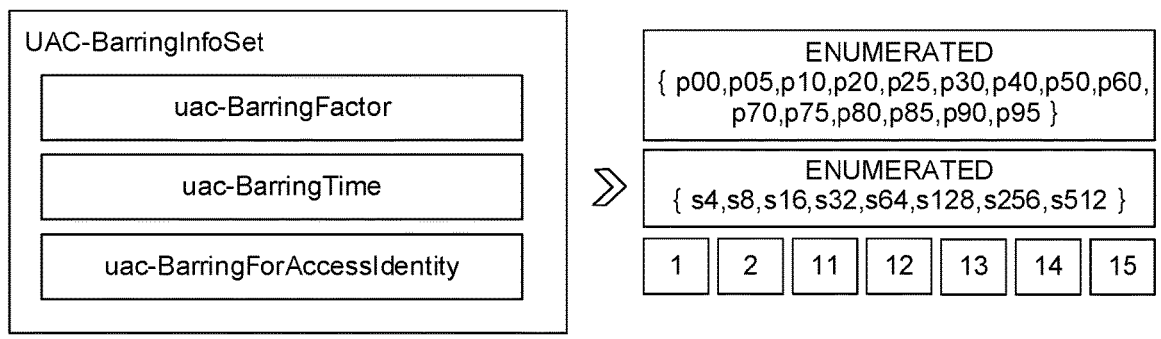
FIG. 2 is a schematic diagram of a UAC-BarringInfoSet provided by an embodiment of the present application.

The access control operation is executed based on the UAC parameters (i.e., UAC-BarringInfoSet), and the specific contents of the UAC-BarringInfoSet are shown in FIG. 2 in the following. In the premise that both T390 and T302 are not running and the access category is not access category 0, the execution of the access control operation includes the following steps:

1) If the corresponding bit of the access identity in uac-BarringForAccessIdentity is set to 0, it means that access is allowed, and if the corresponding bit is set to 1, further determination is required by the following step 2);

2) Generate a random number (rand), the range of rand is $0 \leq rand < 1$. If the random number is lower than uac-BarringFactor, it means that access is allowed, otherwise it means that access is prohibited. If access is prohibited, a random number (rand) is generated in which the range of rand is $0 \leq rand < 1$, and T390 is initiated and $T390=(0.7+0.6 \times rand) \times uac\text{-}BarringTime$.

For events triggered by the NAS layer, the NAS layer determines the access identity, the access category, and the access reason (or so-called cause value). The NAS layer provides the access identity and the access category to the AS layer, in which the AS layer is responsible for executing the access control operation. If access is allowed, the AS layer notifies the NAS layer, and the NAS layer provides the access reason to the AS layer. Based on the feedback of the access control operation from the AS layer, the NAS layer is responsible for stopping or allowing service transmission.

For events triggered by the AS layer, including events triggered by paging, or RAN Notification Area Update (RANU), wherein:

For the events triggered by paging: the access category is access category 0, which is not controlled by the access control operation.

In addition, the cause value is overridden, and the NAS layer interacts with the AS layer, and the NAS layer provides the cause value.

For the events triggered by RNAU: the access category is access category 8, the access identity needs to be provided by the NAS layer to the AS layer, and the interaction information between the NAS layer and the AS layer belongs to the UE implementation behavior. The cause value is determined by the AS layer to be ma-Update.

There is no feedback mechanism for the reception of MBMS services (also referred to as broadcast services or multicast services), and any terminal device in an RRC state can receive MBMS service, so the terminal device does not need to enter the connected state to receive MBMS service. Therefore, there is no access control mechanism for the reception of MBMS service. In NR, some schemes will have high reliability requirements for MBMS services and require that all members within the multicast receive MBMS services, so the members within the multicast need to provide feedback on the reception of MBMS services. It can be seen that for the reception of some MBMS services, although it is also the way to send MBMS services, the terminal device may be required to enter the connected state to receive MBMS services so as to provide feedback on the reception of MBMS services. In such a case, the access control mechanism for entering the connected state for the reception of MBMS services needs to be clarified. For this reason, the following technical solutions of the embodiments of the present application are provided.

Figure 3:
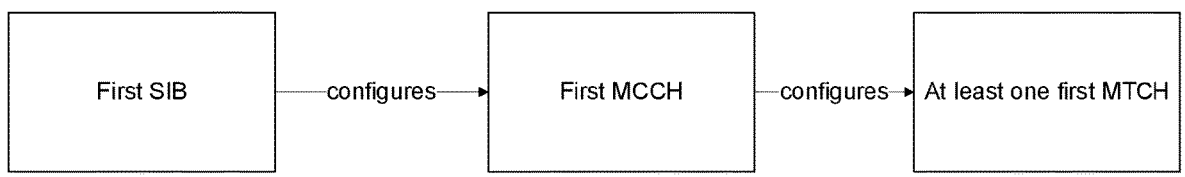
FIG. 3 is a schematic diagram of a first SIB-related configuration provided by an embodiment of the present application.

In the technical solution of the embodiments of the present application, a new SIB (referred to as first SIB) is defined. With reference to FIG. 3, the first SIB includes the configuration information of the first MCCH, where the first MCCH is the control channel of the MBMS service. In other words, the first SIB is used to configure the configuration information of the control channel of the NR MBMS and optionally, the control channel of the NR MBMS may also be referred to as NR MCCH (i.e., the first MCCH).

Further, the first MCCH is used to carry the first signaling, and the embodiment of the present application does not limit the name of the first signaling, e.g., the first signaling is signaling A. The first signaling includes the configuration information of at least one first MTCH. Here, the first MTCH is the service channel (also referred to as data channel or transport channel) of the MBMS service, and the first MTCH is used to transmit the MBMS service data (e.g., the service data of the NR MBMS). In other words, the first MCCH is used to configure the configuration information of the service channel of the NR MBMS, and optionally, the service channel of the NR MBMS may also be referred to as the NR MTCH (i.e., the first MTCH).

Specifically, the first signaling is used to configure the service channel of the NR MBMS, the service information corresponding to the service channel, and the scheduling information corresponding to the service channel. Further, optionally, the service information corresponding to the service channel, such as TMGI, session id, and other identification information identifying the service. The scheduling information corresponding to the service channel, for example, may comprise the RNTI (e.g., G-RNTI) used when the MBMS service data corresponding to the service channel is scheduled, DRX configuration information, etc.

Note that the transmission of both the first MCCH and the first MTCH is based on the PDCCH scheduling. In particular, the RNTI used by the PDCCH for scheduling the first MCCH uses a network-wide unique identity, i.e., it is a fixed value. The RNTI used by the PDCCH for scheduling the first MTCH is configured through the first MCCH.

Further, at least one of the following is carried in the first MCCH: first indication information, and the first indication information is configured to indicate whether the MBMS service (corresponding to the TMGI and/or session identity) requires HARQ feedback; second indication information, the second indication information being configured to indicate the number of members within the multicast group corresponding to the MBMS service; and third indication information, the third indication information being configured to indicate whether the terminal device needs to receive the MBMS service after entering the connected state. Here, when the terminal device is registered to the MBMS service, the network device assigns a membership index number to the terminal device registered to the MBMS service.

Figure 4:
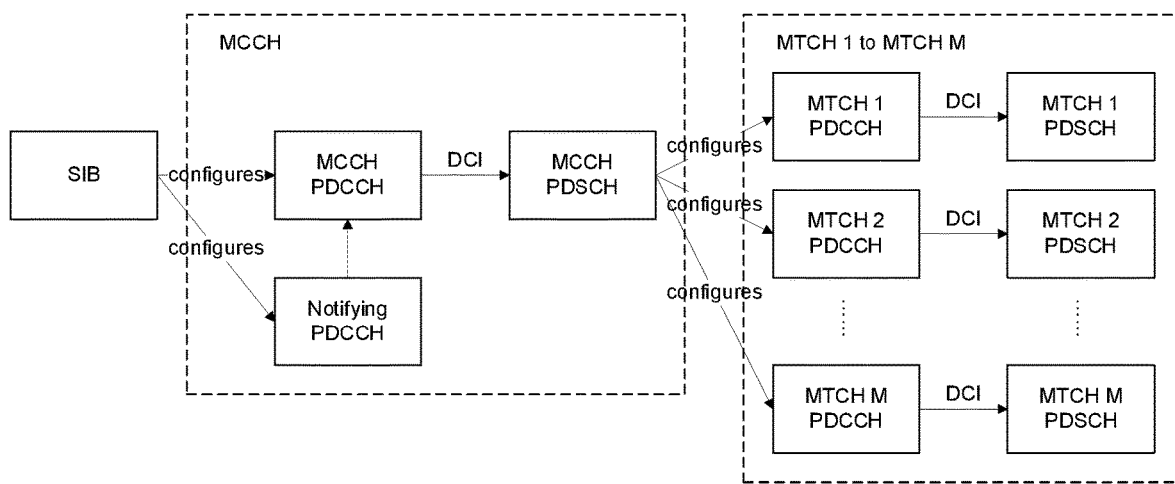
FIG. 4 is a schematic diagram of a point to multiploint (PTM) configuration transmission mechanism provided by an embodiment of the present application.
Figure 5:
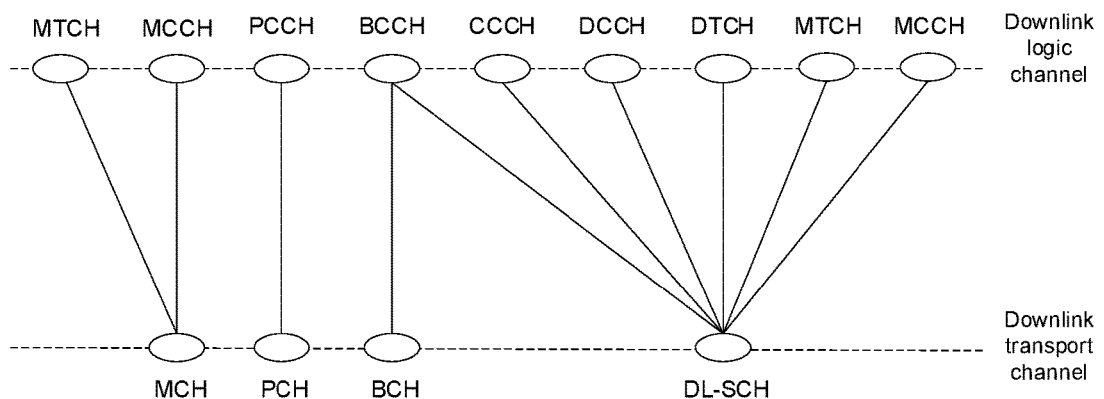
FIG. 5 is a diagram of a PTM channel and mapping diagram thereof provided by an embodiment of the present application.

It is to be noted that the embodiment of the present application does not limit the naming of the first SIB, the first MCCH and the first MTCH. For purposes of description, the first SIB may also be referred to as SIB, the first MCCH may also be referred to as MCCH, and the first MTCH may also be referred to as MTCH. Referring to FIG. 4, SIB is used to configure the PDCCH for scheduling the MCCH (i.e., MCCH PDCCH) and to notify PDCCH, wherein the DCI carried by the MCCH PDCCH schedules the PDSCH for transmitting the MCCH (i.e., MCCH PDSCH). Further, M PDCCHs (i.e., MTCH 1 PDCCH, MTCH 2 PDCCH, MTCH M PDCCH) are configured via MCCH to schedule the MTCH, wherein the DCI carried by MTCH n PDCCH schedules the PDSCH for transmitting the MTCH n (i.e., MTCH n PDSCH), where n is an integer greater than or equal to 1 and less than or equal to M. Referring to FIG. 5, MCCH and MTCH are mapped to DL-SCH, and further, DL-SCH is mapped to PDSCH, where MCCH and MTCH belong to the logical channel, DL-SCH belongs to the transport channel, and PDSCH belongs to the physical channel.

Figure 6:
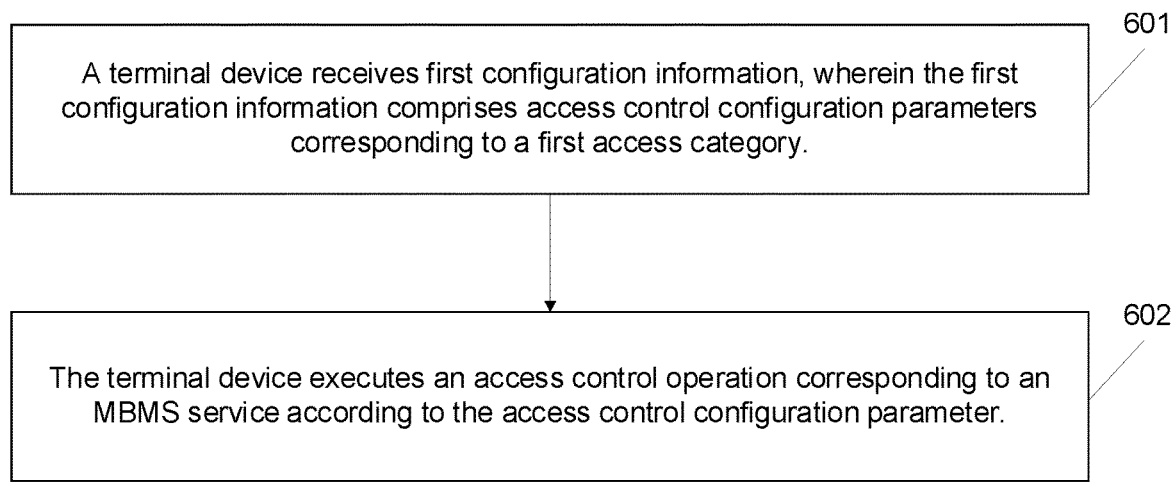
FIG. 6 is a first schematic diagram of a flowchart of an access control method provided by an embodiment of the present application.

FIG. 6 is a first schematic diagram of the flow of the access control method provided in an embodiment of the present application. As shown in FIG. 6, the access control method includes the following steps.

Step 601: the terminal device receives first configuration information, wherein the first configuration information comprises the access control configuration parameters corresponding to the first access category.

In the embodiments of the present application, MBMS service refers to any kind of MBMS service. It should be noted that the description of "MBMS service" in the embodiments of the present application can also be replaced with "broadcast service" or "multicast service".

In the embodiment of the present application, an access category is assigned (or defined) to the MBMS service, referred to as the first access category. Optionally, the first access category is for all MBMS services, i.e., multiple MBMS services correspond to the first access category.

For example, access categories of all the MBMS service 1, MBMS service 2, . . . , MBMS service n are the first access category.

In the embodiment of the present application, the network device sends the first configuration information, and the terminal device receives the first configuration information, wherein the first configuration information includes access control configuration parameters corresponding to the first access category. Optionally, the network device can be a base station, such as a gNB.

It should be noted that the description of "access control configuration parameters" in the embodiment of the present application can also be replaced with "access control parameter set" or "UAC-BarringInfoSet."

In the embodiment of the present application, the access control configuration parameters include at least one of the following:
- first information, wherein the first information is configured to determine an access identity that allows access and/or an access identity that prohibits access;
- second information, wherein the second information is configured to determine a barring factor (BarringFactor); or
- third information, wherein the third information is configured to determine a barring time (BarringTime).

Wherein the first information is uac-BarringForAccessIdentity, the second information is uac-BarringFactor, and the third information is uac-BarringTime.

In an optional embodiment of the present application, the first configuration information is configured via a first SIB or a first MCCH. Here, the first SIB and the first MCCH can be understood with reference to the relevant descriptions in the preceding embodiments.

In implementation, the network device (i.e., the base station) configures the access control configuration parameters corresponding to the first access category of the MBMS service in the first SIB or the first MCCH, as shown in Table 3 in the following.

TABLE 3

| | |
|---|---|
| uac-BarringFactor | ENUMERATED {p00, p05, p10, p15, p20, p25, p30, p40, p50, p60, p70, p75, p80, p85, p90, p95}, |
| uac-BarringTime | ENUMERATED {s4, s8, s16, s32, s64, s128, s256, s512}, |
| uac-BarringForAccessIdentity | BIT STRING (SIZE(7)) |

Step 602: the terminal device executes an access control operation corresponding to an MBMS service according to the access control configuration parameter.

In the embodiments of the present application, the access control configuration parameter is used for the terminal device to execute the access control operation corresponding to the MBMS service. Specifically, the NAS layer of the terminal device sends fourth indication information to the AS layer of the terminal device, wherein the fourth indication information is configured to indicate at least one of the following: the first access category corresponding to the MBMS service, the first access identity corresponding to the MBMS service, a service identity corresponding to the MBMS service, identity information of a member corresponding to the MBMS service, or the identification information of the member corresponding to the MBMS service; the AS layer of the terminal device determines whether to execute the access control operation corresponding to the MBMS service based on the fourth indication information; and if it is determined to execute the access control operation corresponding to the MBMS service, executes the access control operation corresponding to the MBMS service according to the access control configuration parameter.

The technical solutions of the embodiments of the present application are illustrated in the following with specific examples.

Example 1

After the terminal device receives the first configuration information, if the MBMS service requires the terminal device to enter the connected state, the UE NAS layer (i.e., the NAS layer of the terminal device) submits the first access category corresponding to the MBMS service and/or the first access identity corresponding to the MBMS service to the UE AS layer (i.e., the AS layer of the terminal device), and the UE AS layer executes the following access determination process based on the first access category and/or the first access identity submitted by the UE NAS layer and the access control configuration parameters corresponding to the first access category.

First, the terminal device determines whether an access control operation is executed or needs to be executed based on the first access identity (i.e., the UAC process), and if an access control operation needs to be executed: a first random number is generated; a second random number is generated if access is determined to be prohibited based on the first random number and the second information; and a first timer is activated based on the second random number and the third information, the first timer being configured to restrict access to the MBMS services.

In an implementation, the terminal device determines whether the access control operation is executed or needs to be executed based on the first access identity and the first information (i.e. uac-BarringForAccessIdentity), and if the access control operation needs to be executed, then: a first random number (denoted as rand1) is generated in which the range of rand1 is 0≤rand<1, and if rand1 is lower than the second information (i.e., uac-BarringFactor), then access is allowed; otherwise access is prohibited. If access is prohibited, a second random number (denoted as rand2) is generated in which the range of rand2 is 0≤rand2<1, T390 is activated and T390=(0.7+0.6×rand2)×third information (i.e., uac-BarringTime).

Example 2

The access control configuration parameters described in solution (A) include, in addition to the various information in the preceding schemes, first indication information, and the first indication information is configured to indicate at least one of the following: an MBMS service that executes or requires to execute an access control operation; or an MBMS service that does not execute or is not required to execute an access control operation. The terminal device is able to determine, based on the first indication information, whether an MBMS service executes or requires to execute an access control operation (i.e., a UAC process).

In an optional embodiment, the first indication information includes a first bitmap, each bit in the first bitmap corresponds to an MBMS service (or an identification of the MBMS service), and the value of the bit indicates whether the MBMS service corresponding to the bit executes or requires to execute an access control operation.

For example, a specific bit in the first bitmap is set to 1 (or 0) to indicate that the MBMS service corresponding to that bit requires to execute an access control operation, and a specific bit in the first bitmap is set to 0 (or 1) to indicate that the MBMS service corresponding to that bit does not require to execute an access control operation.

The configuration information of the MBMS service described in solution (B) carries second indication information, wherein the second indication information is used to indicate whether the MBMS service executes or requires to execute an access control operation.

In an implementation, when configuring the MBMS service, the configuration information of each MBMS service is associated with indication information (i.e., the second indication information), and the second indication information has a value to indicate whether the MBMS service executes or requires to execute an access control operation.

For example, a value of 0 (or 1) for the second indication information indicates that the MBMS service needs to execute an access control operation, and a value of 1 (or 0) for the second indication information indicates that the MBMS service does not need to execute an access control operation.

The access control configuration parameters described in solution (C) include, in addition to the various information in the preceding schemes, third indication information, and the third indication information is configured to indicate at least one of the following: members that execute or are required to execute the access control operation; or members that do not execute or are not required to execute the access control operation; wherein the members refer to members receiving the MBMS service.

In an optional embodiment, the third indication information comprises at least one of the following: identity information and/or identification information of at least one first member, wherein the first member is a member that is required to execute the access control operation; or identity information and/or identification information of at least one second member, wherein the second member is a member that is not required to execute the access control operation.

It is to be noted that the above-mentioned first member and/or second member indicated refer to the members receiving the MBMS service.

It is to be noted that the above solution (A), solution (B), and solution (C) can be implemented individually, or the above solution (A) and solution (C) can be combined together for implementation, or the above solution (B) and solution (C) can be combined together for implementation.

After the terminal device receives the first configuration information, if the MBMS service requires the terminal device to enter the connected state, the UE NAS layer (i.e., the NAS layer of the terminal device) submits the first access category corresponding to the MBMS service, and/or the first access identity corresponding to the MBMS service, and/or the service identity corresponding to the MBMS service, and/or the identity information of the member corresponding to the MBMS service, and/or the identification information of the member corresponding to the MBMS service to the UE AS layer (i.e. the AS layer of the terminal device), and the UE AS layer performs the following access determination process based on the first access category corresponding to the MBMS service, and/or the first access identity corresponding to the MBMS service, and/or the service identity corresponding to the MBMS service, and/or the identity information of the member corresponding to the MBMS service, and/or the identification information of the member corresponding to the MBMS service, submitted by the UE NAS layer, and the access control configuration parameters corresponding to the first access category.

First, the terminal device determines whether an access control operation (i.e., a UAC process) needs to be executed based on the first access category corresponding to the MBMS service, and/or the first access identity corresponding to the MBMS service, and/or the service identity corresponding to the MBMS service, and/or the identity information of the member corresponding to the MBMS service, and/or the identification information of the member corresponding to the MBMS service, and if the access control operation needs to be executed, then generates: a first random number; if access is determined to be prohibited based on the first random number and the second information, generates a second random number; and initiates a first timer based on the second random number and the third information, the first timer being configured to restrict access to the MBMS service.

In implementation, the terminal device generates a first random number (denoted as rand1), with rand1 in the range of 0≤rand<1. If rand1 is lower than the second information (i.e., uac-BarringFactor), access is allowed, otherwise access is prohibited. If access is prohibited, a second random number (denoted as rand2) is generated and rand2 is in the range of 0≤rand2<1, T390 is activated and T390=(0.7+0.6× rand2)×third information (i.e. uac-BarringTime).

It should be noted that the above service identity corresponding to the MBMS service, and/or the identity information of the member corresponding to the MBMS service, and/or the identification information of the member corresponding to the MBMS service can also be obtained by the terminal device through its own implementation.

Example 3

The terminal device determines whether to execute an access control operation corresponding to the MBMS service based on the fourth information; if it is determined to execute the access control operation corresponding to the MBMS service, it executes an access control operation corresponding to the MBMS service according to the access control configuration parameters.

The fourth information of solution (I) is carried in the system broadcast message sent by the first cell, and the fourth information is configured to indicate whether the terminal device executes or needs to execute an access control operation to receive the MBMS service sent by the first cell.

Here, the first cell may be the cell sending the MBMS service, and the first cell sends a fourth information via a system broadcast message, wherein the fourth information indicates whether the terminal device executes or needs to execute an access control operation (i.e., a UAC process) to receive the MBMS service. If the fourth information indicates that the access control operation needs to be executed, the terminal device executes the access control operation in accordance with the first access category and/or the first access identity provided by the NAS layer and the access control configuration parameters carried in the first configuration information. If the fourth information indicates that the access control operation does not need to be executed, the terminal device does not execute the access control operation.

It is to be noted that the fourth information here is at cellular granularity (per cell), i.e., whether the access control operation is executed or needs to be executed indicated by the fourth information is specific to that cell.

The fourth information described in solution (II) is predefined information, and the fourth information defines that the MBMS service corresponding to the first access category does not execute the access control operation.

Here, it can be agreed by agreement that the MBMS service corresponding to the first access category does not execute access control operations. The terminal device does not execute the access control operation corresponding to the MBMS service.

It should be noted that the above solution (I) as well as solution (II) can be implemented separately.

Figure 7:
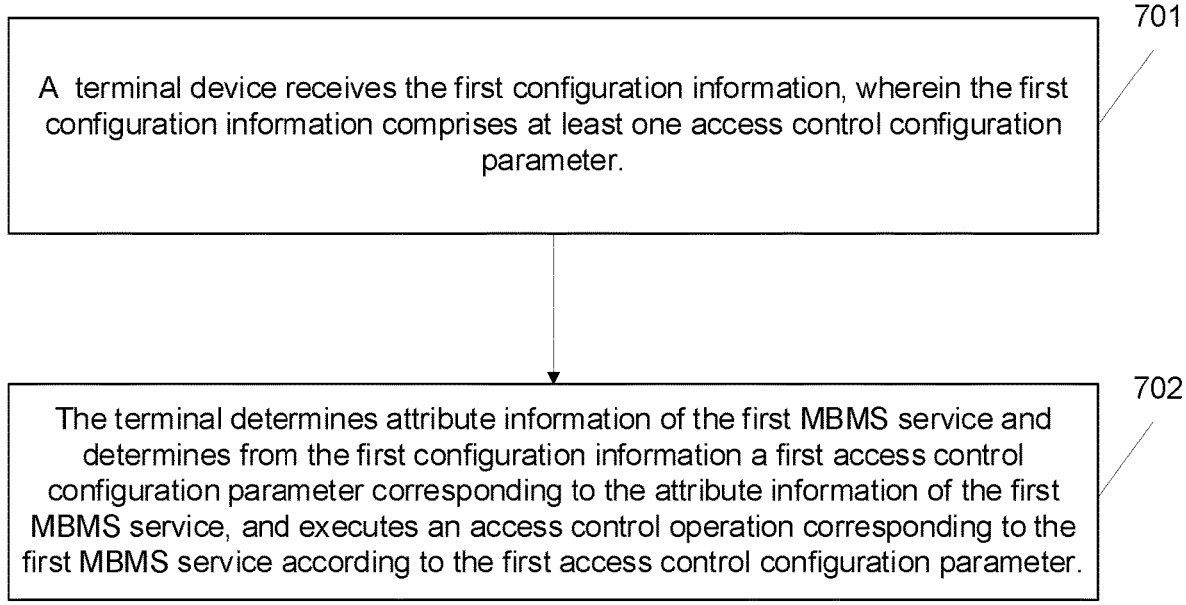
FIG. 7 is a second schematic diagram of a flowchart of an access control method provided by another embodiment of the present application.

FIG. 7 is a second schematic diagram of the flow of the access control method provided in an embodiment of the present application. As shown in FIG. 7, the access control method includes the following steps:

Step 701: the terminal device receives the first configuration information, wherein the first configuration information comprises at least one access control configuration parameter.

In the embodiment of the present application, the network device sends the first configuration information and the terminal device receives the first configuration information, wherein the first configuration information includes at least one access control configuration parameter. Optionally, the network device may be a base station, such as a gNB.

It should be noted that the description of "access control configuration parameters" in this embodiment of the present application can also be replaced with "access control parameter set" or "UAC-BarringInfoSet."

In the embodiment of the present application, the access control configuration parameters include at least one of the following:
 first information, wherein the first information is configured to determine an access identity that allows access and/or an access identity that prohibits access;
 second information, wherein the second information is configured to determine a barring factor BarringFactor; or
 third information, wherein the third information is configured to determine a barring time BarringTime.

Wherein the first information is uac-BarringForAccessIdentity, the second information is uac-BarringFactor, and the third information is uac-BarringTime.

In an optional embodiment of the present application, the first configuration information is configured via a first SIB or a first MCCH. Here, the first SIB and the first MCCH can be understood with reference to the relevant descriptions in the preceding embodiments.

In an implementation, the network device (i.e., the base station) configures at least one access control configuration parameter in the first SIB or the first MCCH, and the content of each access control configuration parameter can be referred to as shown in Table 3 above.

Step 702: the terminal determines attribute information of the first MBMS service and determines from the first configuration information a first access control configuration parameter corresponding to the attribute information of the first MBMS service, and executes an access control operation corresponding to the first MBMS service according to the first access control configuration parameter.

In the embodiment of the present application, the at least one access control configuration parameter comprises a first access control configuration parameter, the first access control configuration parameter having a correspondence with the first attribute information of the first MBMS service, the first access control configuration parameter being used by the terminal device to execute the access control operation corresponding to the first MBMS service.

In an optional embodiment, the attribute information comprises at least one of the following: an access category corresponding to the MBMS service, a service identity corresponding to the MBMS service, identity information of a member corresponding to the MBMS service, or identification information of a member corresponding to the MBMS service.

In the embodiment of the present application, the NAS layer of the terminal device sends fifth indication information (for indicating attribute information) to the AS layer of the terminal device, the fifth indication information being configured to indicate at least one of the following: the first access category corresponding to the first MBMS service, the first access identity corresponding to the first MBMS service, service identity corresponding to the first MBMS service, identity information of a member corresponding to the first MBMS service, or the identification information of the member corresponding to the first MBMS service. The AS layer of the terminal device determines a first access control configuration parameter from the first configuration information based on the fifth indication information, determines whether to execute the access control operation corresponding to the first MBMS service based on the first access identity corresponding to the first MBMS service, and if it is determined that the access control operation corresponding to the first MBMS service is executed, then the access control operation corresponding to the first MBMS service is executed according to the access control configuration parameter.

The technical solutions of the embodiments of the present application are illustrated in the following with specific examples.

Example 4

An access category is assigned to each MBMS service, i.e., the service identity of each MBMS service is associated with an access category. Optionally, different MBMS services correspond to different access categories.

For example, MBMS service 1 corresponds to access category 1, MBMS service 2 corresponds to access category 2, . . . , and MBMS service n corresponds to access category n.

After the terminal device receives the first configuration information, if the MBMS service requires the terminal device to enter the connected state, the UE NAS layer (i.e., the NAS layer of the terminal device) submits the first access category and/or the first access identity corresponding to the first MBMS service to the UE AS layer (i.e. the AS layer of the terminal device), and the UE AS layer determines the first access control configuration parameter from the first configuration information based on the first access category submitted by the UE NAS layer; and following access determination process is executed based on the first access identity and the first access control configuration parameter corresponding to the first access category.

First, the terminal device determines whether an access control operation (i.e., the UAC process) is executed or needs to be executed based on the first access identity, and if the access control operation needs to be executed, then: a first random number is generated; if access is determined to be prohibited based on the first random number and the second information, a second random number is generated; and a first timer is activated based on the second random number and the third information, the first timer being configured to restrict access to the MBMS service.

In an implementation, the terminal device determines whether the access control operation is executed or needs to be executed based on the first access identity and the first information (i.e. uac-BarringForAccessIdentity), and if the access control operation needs to be executed, then: a first random number (denoted as rand1) is generated, rand1 is in the range $0 \leq rand < 1$, and if rand1 is lower than the second information (i.e., uac-BarringFactor), access is allowed; otherwise access is prohibited. If access is prohibited, a second random number (denoted as rand2) is generated and rand2 is in the range of $0 \leq rand2 < 1$, T390 is activated and $T390 = (0.7 + 0.6 \times rand2) \times third$ information (i.e. uac-BarringTime).

Example 5

In the first configuration information, different access control configuration parameters correspond to different attribute information. The attribute information includes at least one of the following: the access category corresponding to the MBMS service, the service identity corresponding to the MBMS service, the identity information of the member corresponding to the MBMS service, or the identification information of the member corresponding to the MBMS service.

As shown, each access control configuration parameter is associated with attribute information. The attribute information includes the access category corresponding to the MBMS service, and/or the service identity corresponding to the MBMS service, and/or the identity information of the member corresponding to the MBMS service, and/or the identification information of the member corresponding to the MBMS service. That is, different types of attribute information correspond to different access control configuration parameters respectively.

After the terminal device receives the first configuration information, if the MBMS service requires the terminal device to enter the connected state, the UE NAS layer (i.e., the NAS layer of the terminal device) submits the first access category, and/or the first access identity, and/or the service identity, and/or the identity information of the member, and/or the identification information of the member corresponding to the first MBMS service to the UE AS layer (i.e. the AS layer of the terminal device), and the UE AS layer determines the first access control configuration parameter from the first configuration information based on the first access category, and/or the service identity, and/or the identity information of the member, and/or the identification information of the member submitted by the UE NAS layer; and following access determination process is executed based on the first access identity and the first access control configuration parameter.

First, the terminal device determines whether an access control operation (i.e., the UAC process) is executed or needs to be executed based on the first access identity, and if the access control operation needs to be executed, then: a first random number is generated; if access is determined to be prohibited based on the first random number and the second information, a second random number is generated; and a first timer is activated based on the second random number and the third information, the first timer being configured to restrict access to the MBMS service.

In an implementation, the terminal device determines whether the access control operation is executed or needs to be executed based on the first access identity and the first information (i.e. uac-BarringForAccessIdentity), and if the access control operation needs to be executed, then: a first random number (denoted as rand1) is generated, in which rand1 is in the range 0≤rand<1, and if rand1 is lower than the second information (i.e., uac-BarringFactor), access is allowed; otherwise access is prohibited. If access is prohibited, a second random number (denoted as rand2) is generated and rand2 is in the range of 0≤rand2<1, T390 is activated and T390=(0.7+0.6×rand2)×third information (i.e. uac-BarringTime).

It is to be noted that the service identity corresponding to the MBMS service, and/or the identity information of the member corresponding to the MBMS service, and/or the identification information of the member corresponding to the MBMS service described above may also be obtained by the terminal device through its own implementation.

It should be noted that the above scheme can be used for terminal devices in the idle state, or the connected state, or the inactive state.

Figure 8:
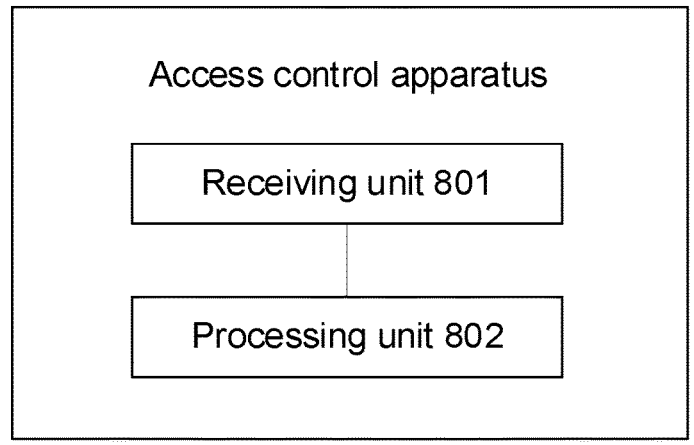
FIG. 8 is a first schematic diagram of the structural composition of the access control apparatus provided by an embodiment of the present application.

FIG. 8 is a first schematic diagram of the structural composition of the access control apparatus provided in the embodiment of the present application, applied to a terminal device. As shown in FIG. 8, the access control apparatus comprises:

a receiving unit 801 for receiving first configuration information, wherein the first configuration information comprises an access control configuration parameter corresponding to a first access category;

a processing unit 802 for executing an access control operation corresponding to an MBMS services according to the access control configuration parameter.

In an optional embodiment, the access control configuration parameters include at least one of the following:
  first information, wherein the first information is configured to determine an access identity that allows access and/or an access identity that prohibits access;
  second information, wherein the second information is configured to determine a barring factor;
  third information, wherein the third information is configured to determine a barring time.

In an optional embodiment, the access control configuration parameters further include first indication information, and the first indication information is configured to indicate at least one of the following:
  an MBMS service that executes or requires to execute an access control operation; or
  an MBMS service that does not execute or is not required to execute the access control operation.

In an optional embodiment, the first indication information comprises a first bitmap, wherein each bit in the first bitmap corresponds to an MBMS service (or an identification of the MBMS service), and the bit has a value for indicating whether the MBMS service corresponding to the bit executes or needs to execute the access control operation.

In an optional embodiment, the configuration information of the MBMS service carries second indication information, wherein the second indication information is used to indicate whether the MBMS service executes or needs to execute an access control operation.

In an optional embodiment, the access control configuration parameters further include third indication information, the third indication information being configured to indicate at least one of the following:
  members that execute or are required to execute the access control operation; or
  members that do not execute or are not required to execute the access control operation;
  Wherein the members refer to members receiving the MBMS service.

In an optional embodiment, the third indication information comprises at least one of the following:
  identity information and/or identification information of at least one first member, wherein the first member is a member that is required to execute the access control operation; or
  identity information and/or identification information of at least one second member, wherein the second member is a member that is not required to execute the access control operation.

In an optional embodiment, the processing unit 802 sends fourth indication information to the AS layer via the NAS layer, wherein the fourth indication information is configured to indicate at least one of the following: the first access category corresponding to the MBMS service, the first access identity corresponding to the MBMS service, a service identity corresponding to the MBMS service, identity information of a member corresponding to the MBMS service, or the identification information of the member corresponding to the MBMS service; determines whether to execute the access control operation corresponding to the MBMS service based on the fourth indication information via the AS layer; and if it is determined to execute the access control operation corresponding to the MBMS service, executes the access control operation corresponding to the MBMS service according to the access control configuration parameter.

In an optional embodiment, the processing unit 802 is configured for determining whether to execute the access control operation corresponding to the MBMS service based on the fourth information; and if it is determined to execute the access control operation corresponding to the MBMS service, the access control operation corresponding to the MBMS service is executed according to the access control configuration parameter.

In an optional embodiment, the fourth information is carried in a system broadcast message sent by the first cell, and the fourth information is configured to indicate whether the terminal device executes or needs to execute an access control operation to receive the MBMS service sent by the first cell.

In an optional embodiment, the fourth information is predefined information, the fourth information defining that the MBMS service corresponding to the first access category does not execute the access control operation.

In an optional embodiment, the processing unit 802, is configured for generating a first random number; generating a second random number if access is determined to be prohibited based on the first random number and the second information; and activating a first timer based on the second random number and the third information, the first timer being configured to restrict access to the MBMS services.

In an optional embodiment, the first configuration information is configured via a first SIB or a first MCCH.

It should be understood by a person skilled in the art that the above description of the access control apparatus in the embodiments of the present application can be understood with reference to the description of the access control method of the embodiments of the present application.

Figure 9:
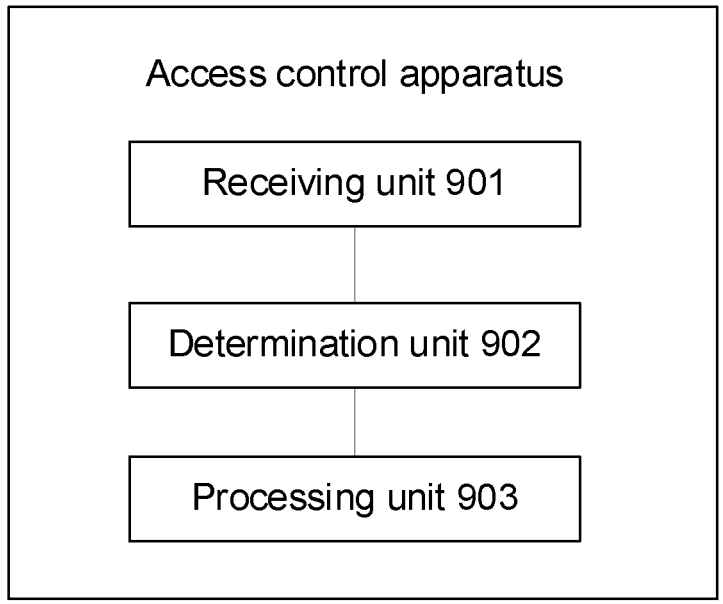
FIG. 9 is a second schematic diagram of the structural composition of the access control apparatus provided by another embodiment of the present application.

FIG. 9 is a second schematic diagram of the structural composition of the access control apparatus provided in the embodiment of the present application, applied to a terminal device. As shown in FIG. 9, the access control apparatus comprises:

- a receiving unit 901 for receiving first configuration information, wherein the first configuration information comprises at least one access control configuration parameter;
- a determination unit 902 for determining attribute information of a first MBMS service and determining a first access control configuration parameter corresponding to the attribute information of the first MBMS service from the first configuration information; and
- a processing unit 903 for executing the access control operation corresponding to the first MBMS service according to the first access control configuration parameter.

In an optional embodiment, the attribute information comprises at least one of the following:

the access category corresponding to the MBMS service, the service identity corresponding to the MBMS service, the identity information of the member corresponding to the MBMS service, or the identification information of the member corresponding to the MBMS service.

In an optional embodiment, in the first configuration information, different access control configuration parameters correspond to different types of attribute information.

In an optional embodiment, different MBMS services correspond to different access categories.

In an optional embodiment, the access control configuration parameter includes at least one of the following:

first information, wherein the first information is configured to determine an access identity that allows access and/or an access identity that prohibits access;
second information, wherein the second information is configured to determine a barring factor; or
third information, wherein the third information is configured to determine a barring time.

In an optional embodiment, the determination unit 902 is configured for sending fifth indication information to the AS layer via the NAS layer, the fifth indication information being configured to indicate at least one of the following: the first access category corresponding to the first MBMS service, the first access identity corresponding to the first MBMS service, identity information of a member corresponding to the first MBMS service, or the identification information of the member corresponding to the first MBMS service; determining, via the AS layer, a first access control configuration parameter from the first configuration information based on the fifth indication information;

The processing unit 903 is configured for determining, via the AS layer, whether to execute an access control operation corresponding to the first MBMS service based on the first access identity corresponding to the first MBMS service; and if it is determined to execute the access control operation corresponding to the first MBMS service, executing the access control operation corresponding to the first MBMS service according to the access control configuration parameter.

In an optional embodiment, the processing unit 903, is configured for generating a first random number; generating a second random number if it is determined to be prohibited based on the first random number and the second information; and activating a first timer based on the second random number and the third information, the first timer being configured to restrict access to the first MBMS service.

In an optional embodiment, the first configuration information is configured via the first SIB or the first MCCH.

It should be understood by a person skilled in the art that the above description of the access control apparatus in the embodiments of the present application can be understood with reference to the description of the access control methods of the embodiments of the present application.

Figure 10:
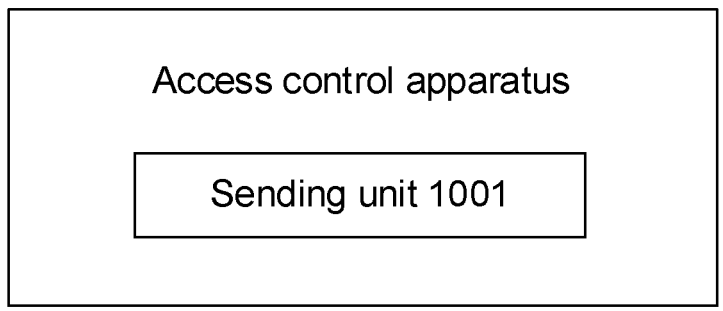
FIG. 10 is a third schematic diagram of the structural composition of the access control apparatus provided by yet another embodiment of the present application.

FIG. 10 is a third schematic diagram of the structural composition of the access control apparatus provided in the embodiment of the present application, applied to a network device (such as a base station). As shown in FIG. 10, the access control apparatus comprises:

a sending unit 1001, which is configured for sending first configuration information, wherein the first configuration information comprises access control configuration parameters corresponding to a first access category; the access control configuration parameters are used by a terminal device to execute an access control operation corresponding to an MBMS service.

In an optional embodiment, the access control configuration parameter includes at least one of the following:

first information, wherein the first information is configured to determine an access identity that allows access and/or an access identity that prohibits access;
second information, wherein the second information is configured to determine a barring factor; or
third information, wherein the third information is configured to determine a barring time.

In an optional embodiment, the access control configuration parameters further comprising first indication information, and the first indication information is configured to indicate at least one of the following:

an MBMS service that executes or requires to execute an access control operation; or
an MBMS service that does not execute or is not required to execute the access control operation.

In an optional embodiment, the first indication information comprises a first bitmap, each bit in the first bitmap corresponding to an MBMS service, and the bit has a value for indicating whether the MBMS service corresponding to the bit executes or requires to execute the access control operation.

In an optional embodiment, the configuration information of the MBMS service carries second indication information, wherein the second indication information is used to indicate whether the MBMS service executes or needs to execute the access control operation.

In an optional embodiment, the access control configuration parameters further include third indication information, the third indication information being configured to indicate at least one of the following:

members that execute or are required to execute the access control operation; or
members that do not execute or are not required to execute the access control operation;
wherein the members refer to members receiving the MBMS service.

In an optional embodiment, the third indication information comprises at least one of the following:

identity information and/or identification information of at least one first member, wherein the first member is a member that is required to execute the access control operation; or identity information and/or identification information of at least one second member, wherein the second member is a member that is not required to execute the access control operation.

In an optional embodiment, the first configuration information is configured via a first SIB or a first MCCH.

It should be understood by a person skilled in the art that the above description of the access control apparatus in the embodiments of the present application can be understood with reference to the description of the access control methods of the embodiments of the present application.

Figure 11:
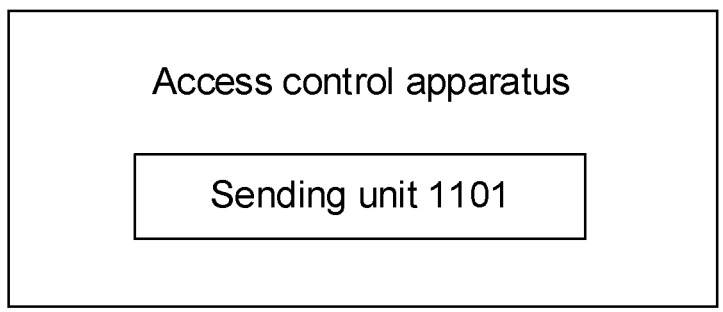
FIG. 11 is a fourth schematic diagram of the structural composition of the access control apparatus provided by still another embodiment of the present application.

FIG. 11 is a fourth schematic diagram of the structural composition of the access control apparatus provided in the embodiment of the present application, applied to a network device (such as a base station). As shown in FIG. 11, the access control apparatus comprises:

a sending unit 1101 for sending first configuration information, wherein the first configuration information comprises at least one access control configuration parameter; the at least one access control configuration parameter comprising a first access control configuration parameter, the first access control configuration parameter having a correspondence with first attribute information of a first MBMS service, the first access control configuration parameter being used by a terminal device to execute the access control operation corresponding the first MBMS service.

In an optional embodiment, the attribute information comprises at least one of the following:

an access category corresponding to the MBMS service, a service identity corresponding to the MBMS service, identity information of a member corresponding to the MBMS service, and identification information of a member corresponding to the MBMS service.

In an optional embodiment, in the first configuration information, different access control configuration parameters correspond to different types of attribute information.

In an optional embodiment, different MBMS services correspond to different access categories.

In an optional embodiment, the access control configuration parameter includes at least one of the following:

first information, wherein the first information is configured to determine an access identity that allows access and/or an access identity that prohibits access;

second information, wherein the second information is configured to determine a barring factor; or third information, wherein the third information is configured to determine a barring time.

In an optional embodiment, the first configuration information is configured via a first SIB or a first MCCH.

It should be understood by a person skilled in the art that the above description of the access control apparatus in the embodiments of the present application can be understood with reference to the description of the access control methods of the embodiments of the present application.

Figure 12:
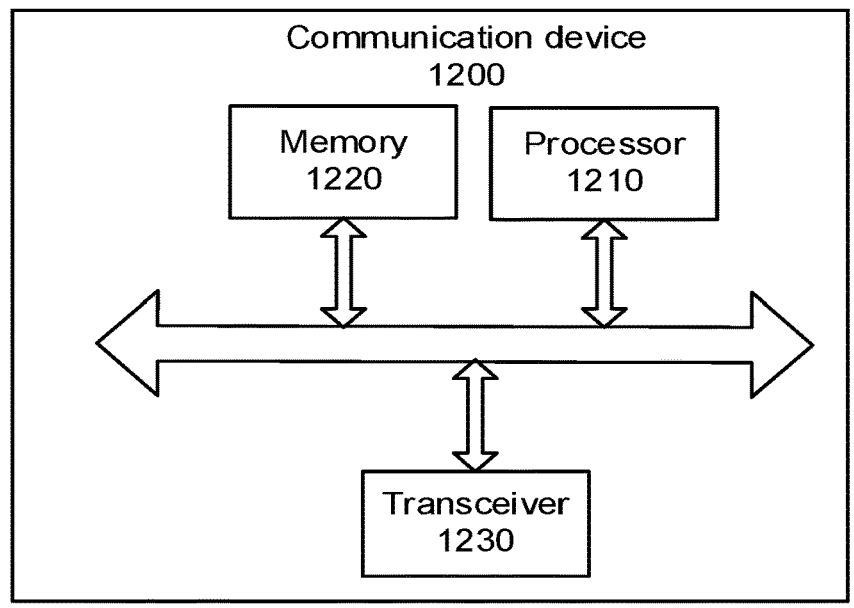
FIG. 12 is a schematic structural diagram of a communication device provided by an embodiment of the present application.

FIG. 12 is a schematic structural diagram of a communication device 1200 provided by an embodiment of the present application. The communication device may be a terminal device, or a network device. The communication device 1200 shown in FIG. 12 includes a processor 1210, wherein the processor 1210 may call and execute a computer program from a memory to realize the methods in the embodiments of the present application.

Optionally, as shown in FIG. 12, the communication device 1200 may also include a memory 1220. In particular, the processor 1210 may call and execute the computer program from the memory 1220 to realize the methods in the embodiments of the present application.

In particular, the memory 1220 may be a separate device that is separated from the processor 1210 or may be integrated in the processor 1210.

Optionally, as shown in FIG. 12, the communication device 1200 may also include a transceiver 1230, in which the processor 1210 may control the transceiver 1230 to communicate with other devices, specifically, to send information or data to, or receive information or data from, other devices.

In particular, the transceiver 1230 may include a transmitter and a receiver. The transceiver 1230 may further comprise an antenna, and the number of antennas may be one or more.

Optionally, the communication device 1200 may specifically be a network device of the embodiment of the present application, and the communication device 1200 may implement the corresponding processes implemented by the network device in each of the methods of the embodiments of the present application, which will not be repeated herein for brevity.

Optionally, the communication device 1200 may be specifically a mobile terminal/terminal device of the embodiment of the present application, and the communication device 1200 may implement the corresponding processes implemented by the mobile terminal/terminal device in each of the methods of the embodiments of the present application, which will not be repeated herein for brevity.

Figure 13:
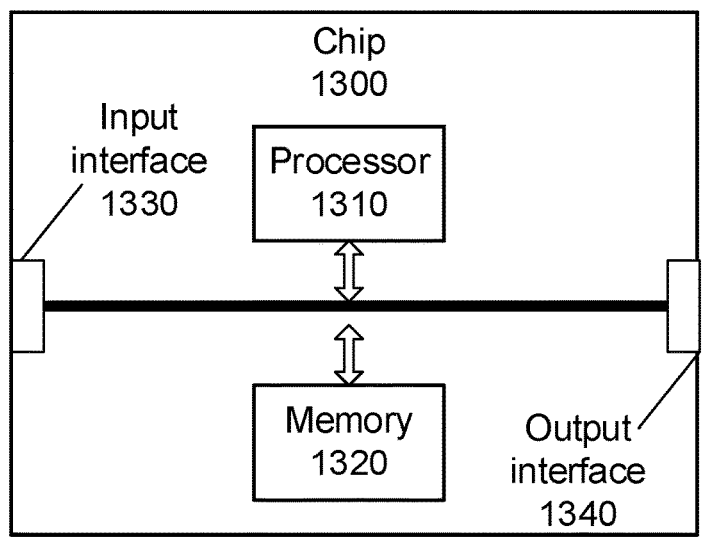
FIG. 13 is a schematic structural diagram of a chip provided by an embodiment of the present application.

FIG. 13 is a schematic structural diagram of a chip provided by an embodiment of the present application. The chip 1300 shown in FIG. 13 includes a processor 1310, wherein the processor 1310 may call and execute a computer program from a memory to implement the methods in the embodiments of the present application.

Optionally, as shown in FIG. 13, the chip 1300 may further include a memory 1320. wherein the processor 1310 may call and execute the computer program from the memory 1320 to implement the methods in the embodiments of the present application.

In particular, the memory 1320 may be a separate device that is separated from the processor 1310, or may be integrated into the processor 1310.

Optionally, the chip 1300 may also include an input interface 1330, wherein the processor 1310 may control the input interface 1330 to communicate with other devices or chips, specifically, to obtain information or data sent by other devices or chips.

Optionally, the chip 1300 may also include an output interface 1340, wherein the processor 1310 may control the output interface 1340 to communicate with other devices or chips, specifically, to output information or data to other devices or chips.

Optionally, the chip can be applied to the network device in the embodiments of the present application, and the chip can implement the corresponding processes implemented by the network device in each of the methods of the embodiments of the present application, which will not be repeated here for brevity.

Optionally, the chip can be applied to the mobile terminal/terminal device in the embodiments of the present application, and the chip can implement the corresponding processes implemented by the mobile terminal/terminal device in each of the methods of the embodiments of the present application, which will not be repeated herein for brevity.

It should be understood that the chip mentioned in the embodiments of the present application may also be referred to as a system level chip, system chip, chip system, or system-on-a-chip (SOC), or the like.

Figure 14:
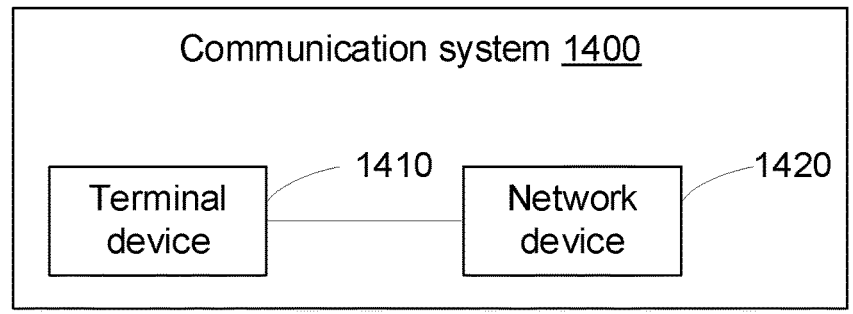
FIG. 14 is a schematic block diagram of a communication system provided by an embodiment of the present application.

FIG. 14 is a schematic block diagram of a communication system 1400 provided by an embodiment of the present application. As shown in FIG. 14, the communication system 1400 includes a terminal device 1410 and a network device 1420.

In particular, the terminal device 1410 can be used to implement the corresponding functions implemented by the terminal devices in the above methods, and the network device 1420 can be used to implement the corresponding functions implemented by the network devices in the above methods, which will not be repeated herein for brevity.

It should be understood that the processor in the embodiments of the present application may be an integrated circuit chip with signal processing capabilities. In implementation, the steps of the above method embodiments may be accomplished by integrated logic circuitry in the hardware in the processor or by instructions in the form of software. The above processor may be a general-purpose processor, a Digital Signal Processor (DSP), an Application Specific Integrated Circuit (ASIC), a Field Programmable Gate Array (FPGA) or other programmable logic device, discrete gate or transistor logic device, or discrete hardware component. The methods, steps, and logical block diagrams of each of the disclosures in the embodiments of this application may be implemented or performed. The general-purpose processor may be a microprocessor or the processor may also be any conventional processor, etc. The steps of the methods disclosed in combination with the embodiments of the present application can be directly embodied as performed by the hardware decode processor or performed with a combination of hardware and software modules in the decode processor. The software modules can be located in a random memory, a flash memory, a read-only memory, a programmable read-only memory or electrically-erasable programmable memory, registers, and other storage media well established in the art. The storage medium is located in the memory and the processor reads the information in the memory and completes the steps of the above methods in combination with its hardware.

It should be understood that the memory in the embodiments of the present application may be volatile memory or non-volatile memory, or may include both volatile and non-volatile memory. In particular, the non-volatile memory may be a Read-Only Memory (ROM), a Programmable ROM (PROM), an Erasable Programmable Read-Only Memory (EPROM), an Electrically Erasable Programmable Read-Only Memory (EPROM), an Electrically EPROM (EEPROM), or a flash memory. The volatile memory may be a Random Access Memory (RAM), which is used as an external cache. By way of illustration, but not limitation, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), and so on. It should be noted that the memories of the systems and methods described herein are intended to include, but are not limited to, these and any other suitable types of memories.

It should be understood that the foregoing memory is exemplary but not restrictive.

For example, the memory in the embodiments of the present application may also be a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), a Direct Rambus RAM (DR RAM), and so on. In other words, the memory in the embodiments of the present application is intended to include, but is not limited to, these and any other suitable types of memory.

Embodiments of the present application also provide a computer readable storage medium for storing a computer program.

Optionally, the computer readable storage medium may be applied to the network device in the embodiments of the present application, and the computer program causes the computer to perform the corresponding processes implemented by the network device in the respective methods of the embodiments of the present application, which will not be repeated herein for brevity.

Optionally, the computer-readable storage medium may be applied to the mobile terminal/terminal device in the embodiments of the present application, and the computer program causes the computer to perform the corresponding processes implemented by the mobile terminal/terminal device in each of the methods of the embodiments of the present application, which will not be repeated herein for brevity.

Embodiments of the present application also provide a computer program product comprising computer program instructions.

Optionally, the computer program product may be applied to the network device in the embodiments of the present application, and the computer program instructions cause the computer to perform the corresponding processes implemented by the network device in each of the methods of the embodiments of the present application, which will not be repeated herein for brevity.

Optionally, the computer program product may be applied to the mobile terminal/terminal device in the embodiments of the present application, and the computer program instructions cause the computer to perform the corresponding processes implemented by the mobile terminal/terminal device in each of the methods of the embodiments of the present application, which will not be repeated herein for brevity.

Embodiments of the present application also provide a computer program.

Optionally, the computer program may be applied to the network device in the embodiments of the present application, and when the computer program is being executed on the computer, the computer program causes the computer to perform the corresponding processes implemented by the network device in each of the methods of the embodiments of the present application, which will not be repeated herein for brevity.

Optionally, the computer program may be applied to the mobile terminal/terminal device in the embodiments of the present application, and when the computer program is being executed on the computer, the computer program causes the computer to perform the corresponding processes implemented by the mobile terminal/terminal device in the respective methods of the embodiments of the present application, which will not be repeated herein for brevity.

A person of ordinary skill in the art may realize that the units and algorithm steps of the examples described in combination with the embodiments disclosed herein can be implemented by electronic hardware or a combination of computer software and electronic hardware. Whether these functions are performed by hardware or software depends on the specific application and design constraint conditions of the technical solution. Professionals and technicians can use different methods for each specific application to implement the described functions, but such implementation should not be considered beyond the scope of this application.

Those skilled in the art can clearly understand that, for the convenience and conciseness of description, the specific working process of the system, device and unit described above can refer to the corresponding process in the foregoing method embodiments, which will not be repeated here.

In the several embodiments provided in this application, it should be understood that the disclosed systems, devices and methods, may be implemented in other ways.

For example, the embodiments of the devices described above are merely illustrative, e.g., the division of the units described, which is only a logical functional division, can be practically implemented in another way, such as multiple units or components can be combined or can be integrated into another system, or some features can be ignored, or not implemented.

In addition, the mutual coupling or direct coupling or communication connections shown or discussed may be indirect coupling or communication connections through some interfaces, devices or units, which can be in electrical, mechanical or other forms.

The units described as separate components may or may not be physically separated, and the components shown as units may or may not be physical units, i.e., they may be located in one place, or they may be distributed to a plurality of network units. Some or all of these units may be selected according to practical needs to achieve the objectives of the solutions of the embodiments.

In addition, each functional unit in each embodiment of the present application may be integrated in a single processing unit, or each unit may be existed alone physically, or two or more units may be integrated in a single unit.

The functions described may be stored in a computer readable storage medium if they are implemented in the form of a software functional unit and sold or used as a separate product. It is understood that the technical solution of the present application, or the part of the technical solution that essentially contributes to the prior art, or the part of the technical solution, may be embodied in the form of a software product, and the computer software product is stored in a storage medium and includes a number of instructions to cause a computer device (which may be a personal computer, a server, or a network device, etc.) to perform all or some of the steps of the method described in each embodiment of the present application. The aforementioned storage media include: a USB flash drive, a removable hard disk, a Read-Only Memory (ROM), a Random Access Memory (RAM), a magnetic disks or optical disks, and other media that can store program codes.

While the application has been described by way of example and in terms of preferred embodiment, it is to be understood that the application is not limited thereto. Those who are skilled in this technology can still make various alterations and modifications without departing from the scope and principles of this disclosure. Therefore, the scope of the present application shall be defined and protected by the following claims and their equivalent.

What is claimed is:

1. An access control method comprising:
a terminal device receiving first configuration information, wherein the first configuration information comprises access control configuration parameters corresponding to a first access category; and
the terminal device executing an access control operation corresponding to a multimedia broadcast multicast (MBMS) service according to the access control configuration parameters;
wherein
the access control configuration parameters comprise a first indication information, and the first indication information is configured to indicate at least one of the following:
the MBMS service that executes or requires to execute the access control operation; or
the MBMS service that does not execute or is not required to execute the access control operation;
wherein
the first indication information comprises a first bitmap, each bit in the first bitmap corresponding to an MBMS service, each bit having a value for indicating whether the MBMS service corresponding to the bit executes or requires to execute the access control operation.

2. The method of claim 1, wherein
the access control configuration parameter comprises at least one of the following:
first information, wherein the first information is configured to determine an access identity that allows access and/or an access identity that prohibits access;
second information, wherein the second information is configured to determine a barring factor BarringFactor; or
third information, wherein the third information is configured to determine a barring time BarringTime.

3. The method of claim 2, wherein
the configuration information for the MBMS service carries second indication information, the second indication information being configured to indicate whether the MBMS service executes or requires to execute the access control operation.

4. The method of claim 2, wherein
the access control configuration parameters further comprise third indication information, and the third indication information is configured to indicate at least one of the following:
members that execute or are required to execute the access control operation; or
members that do not execute or are not required to execute the access control operation;
wherein the members refer to members receiving the MBMS service.

5. The method of claim 4, wherein
the third indication information comprises at least one of the following:
identity information and/or identification information of at least one first member, wherein the first member is a member that is required to execute the access control operation; or
identity information and/or identification information of at least one second member, wherein the second member is a member that is not required to execute the access control operation.

6. The method of claim 2, wherein
the terminal device executing the access control operation corresponding to the MBMS service according to the access control configuration parameters comprises:
a non-access stratum (NAS) layer of the terminal device sending a fourth indication information to an access stratum (AS) layer of the terminal device, wherein the fourth indication information is configured to indicate at least one of the following: the first access category corresponding to the MBMS service, the first access identity corresponding to the MBMS service, a service identity corresponding to the MBMS service, identity information of a member corresponding to the MBMS service, or the identification information of the member corresponding to the MBMS service; and
the AS layer of the terminal device determining whether to execute the access control operation corresponding to the MBMS service based on the fourth indication information; and if it is determined to execute the access control operation corresponding to the MBMS service, executing the access control operation corresponding to the MBMS service according to the access control configuration parameters.

7. The method of claim 6, wherein
the executing the access control operation corresponding to the MBMS service according to the access control configuration parameters comprises:
generating a first random number;
generating a second random number if access is determined to be prohibited based on the first random number and the second information; and
activating a first timer based on the second random number and the third information, the first timer being configured to restrict access to the MBMS service.

8. The method of claim 1, wherein
the access control configuration parameters comprise a first access control configuration parameter of having a correspondence with attribute information of the MBMS service, the attribute information comprises at least one of the following:
an access category corresponding to the MBMS service, a service identity corresponding to the MBMS service, identity information of a member corresponding to the MBMS service, or identification information of a member corresponding to the MBMS service.

9. A terminal device comprising:
a processor and a memory for storing a computer program, the processor for calling and executing the computer program stored in the memory to perform a method, the method comprising:
a terminal device receiving first configuration information, wherein the first configuration information comprises access control configuration parameters corresponding to a first access category; and
the terminal device executing an access control operation corresponding to a multimedia broadcast multicast (MBMS) service according to the access control configuration parameters;
wherein
the access control configuration parameters comprise first indication information, and the first indication information is configured to indicate at least one of the following:
the MBMS service that executes or requires to execute the access control operation; or
the MBMS service that does not execute or is not required to execute the access control operation;

wherein
the first indication information comprises a first bitmap, each bit in the first bitmap corresponding to an MBMS service, each bit having a value for indicating whether the MBMS service corresponding to the bit executes or requires to execute the access control operation.

10. An access control method, the method comprising
a network device sending first configuration information, wherein the first configuration information comprises access control configuration parameters corresponding to a first access category; the access control configuration parameters being used by the terminal device to execute an access control operation corresponding to an MBMS service;
wherein
the access control configuration parameters comprise first indication information, and the first indication information is configured to indicate at least one of the following:
the MBMS service that executes or requires to execute the access control operation; or
the MBMS service that does not execute or is not required to execute the access control operation;
wherein
the first indication information comprises a first bitmap, each bit in the first bitmap corresponding to an MBMS service, each bit having a value for indicating whether the MBMS service corresponding to the bit executes or requires to execute the access control operation.

11. The method of claim 10, wherein
the access control configuration parameters comprise at least one of the following:
first information, wherein the first information is configured to determine an access identity that allows access and/or an access identity that prohibits access;
second information, wherein the second information is configured to determine a barring factor BarringFactor; or
third information, wherein the third information is configured to determine a barring time BarringTime.

12. The method of claim 11, wherein
the configuration information for the MBMS service carries second indication information, the second indication information being configured to indicate whether the MBMS service executes or requires to execute the access control operation.

13. The method of claim 11, wherein
the access control configuration parameters further comprise third indication information, and the third indication information is configured to indicate at least one of the following:
members that execute or are required to execute the access control operation; or
members that do not execute or are not required to execute the access control operation;
wherein the members refer to members receiving the MBMS service.

14. The method of claim 13, wherein
the third indication information comprises at least one of the following:
identity information and/or identification information of at least one first member, wherein the first member is a member that is required to execute the access control operation; or identity information and/or identification information of at least one second member, wherein the second member is a member that is not required to execute the access control operation.

15. The method of claim 10, wherein the first configuration information is configured via a first SIB or a first MCCH.

16. The method of claim 10, wherein the access control configuration parameters comprise a first access control configuration parameter of having a correspondence with attribute information of the MBMS service, the attribute information comprises at least one of the following:

an access category corresponding to the MBMS service, a service identity corresponding to the MBMS service, identity information of a member corresponding to the MBMS service, and identification information of a member corresponding to the MBMS service.

* * * * *